Patented Feb. 9, 1926.

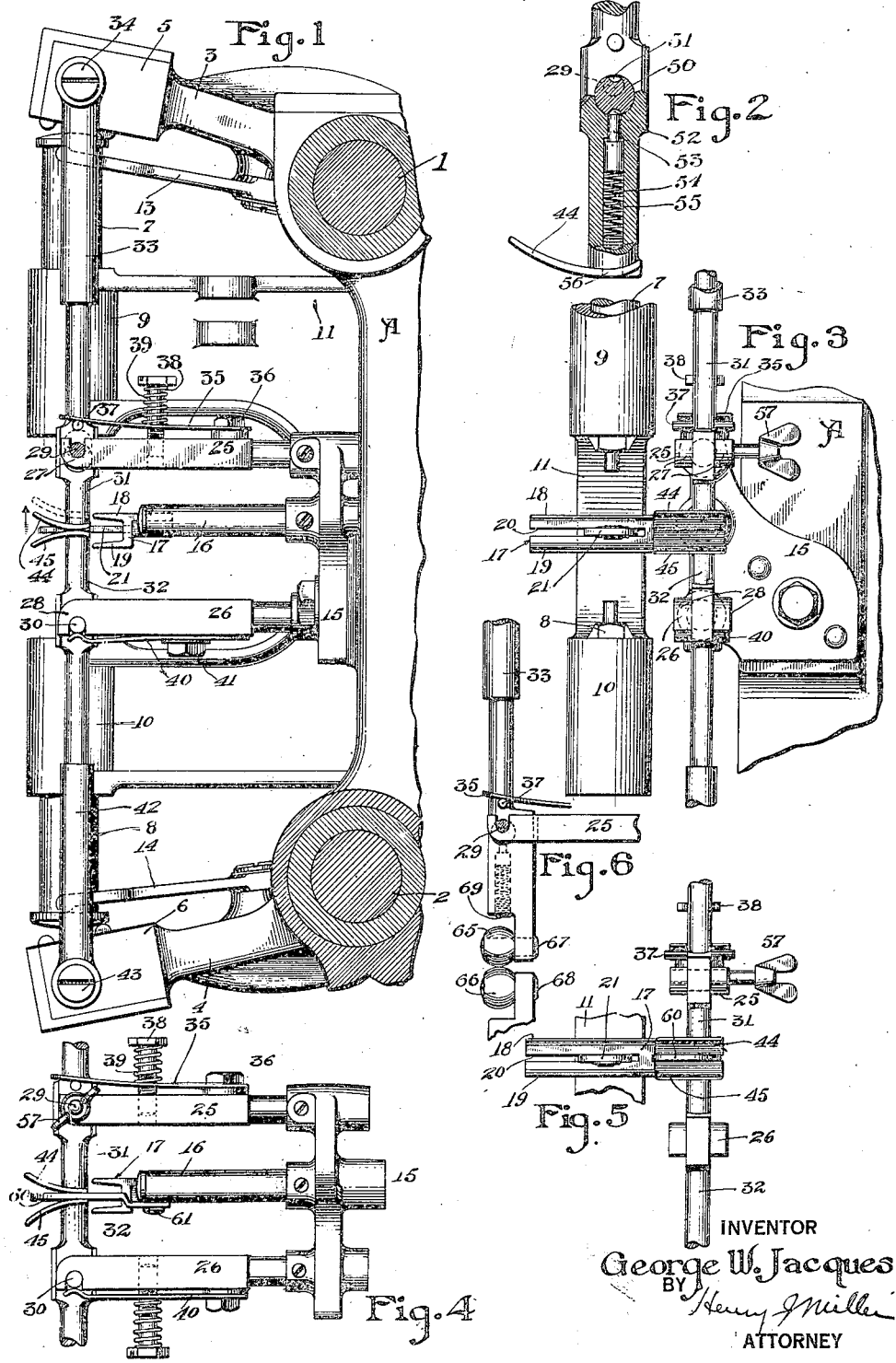

1,571,952

UNITED STATES PATENT OFFICE.

GEORGE W. JACQUES, OF STRATFORD, CONNECTICUT, ASSIGNOR, BY MESNE ASSIGNMENTS, TO UNITED SHOE MACHINERY CORPORATION, OF PATERSON, NEW JERSEY, A CORPORATION OF NEW JERSEY.

FASTENER-SETTING MACHINE.

Application filed November 17, 1920. Serial No. 424,606.

*To all whom it may concern:*

Be it known that I, GEORGE W. JACQUES, a citizen of the United States, residing at Stratford, in the county of Fairfield and State of Connecticut, have invented certain new and useful Improvements in Fastener-Setting Machines, of which the following is a specification, reference being had therein to the accompanying drawings.

This invention relates to fastener-setting machines and more especially to automatic machines in which work-feeding mechanism and a presserfoot are used. The accompanying drawings disclose the invention as embodied in an eyeleting machine but the invention is applicable to other types of fastener-inserting machines and is to be so understood in construing some of the claims appended hereto. For the purposes of description, but not of limitation, the invention will be described in terms relating to eyeleting machines, particularly since the drawings represent an eyeleting machine organization.

In some eyeleting machines a presserfoot is arranged to engage the work in advance of the work-feeding mechanism to clamp the work during the feeding period. In such machines the presserfoot is not intended to retard the feeding movement or lessen its amplitude, but is intended to maintain a drag to eliminate wrinkles or other irregularities in the work so that the spacing of the eyelets will be uniform. Again, in duplex eyeleting machines (the accompanying disclosure representing a machine of the duplex type) in which two work elements are arranged in confronting relation to receive eyelets it is common to provide two cooperative clamping members arranged to press the two confronting work elements against each other and to maintain such pressure during the feeding period, so that one of the work elements will not creep relatively to the other. In any case, whether the machine is of the duplex type or of the type that inserts only one eyelet at a time, it sometimes happens that an eyelet is missed or is improperly inserted or clenched. In either case it is the operative's duty to insert an eyelet wherever one has been missed or to replace an improperly inserted eyelet with one inserted correctly, but this repair operation involves a difficulty that is not encountered when the work is passed through the machine for the first time. In the first instance there are no previously inserted eyelets to encounter and possibly catch on the presserfoot or other work-clamping member, but when repairing a previously eyeleted shoe one or more previously inserted eyelets are likely to encounter the presserfoot.

Accordingly one object of the invention is to provide an improved presserfoot mechanism such that the presserfoot may maintain constant pressure on the work during the regular course of procedure and such that it may be maintained retracted from operative position whenever it is desired to use the machine to supply an eyelet that has been missed or to replace one that has been improperly inserted in the first instance. When it is desired to insert a single eyelet with a duplex machine it is most convenient to use the upper group of tools, since their operation is more readily observable than that of the lower group of tools.

Another object of the invention is to provide improved work-guiding means for guiding the work to fastener-inserting mechanism. In corset work, for example, the fasteners should be inserted in the webs or channels of unstiffened fabric between two adjacent stiffening strips, and in no case should a stiffening strip be struck by a punch or by a fastener, since such striking would not only weaken or break the stiffening strip but would result in imperfect setting of the fastener. When, as heretofore, the guiding of the corset is dependent upon an edge gage to locate the fasteners, a faulty adjustment of the gage, or faulty arrangement of a stiffening strip in the corset, or faulty manipulation of the corset in the fastener-inserting machine may cause one of the stiffening strips to be fouled by the punch and the fastener-inserting mechanism.

To guard against the fouling above-mentioned, a feature of the invention consists in work-guiding means arranged to run in a channel or equivalent portion of the work such as the relatively thin, unstiffened web of fabric between two stiffening strips of a corset, to guide the work by such channel or by the elements that define the boundaries thereof rather than by an edge of the work, and thereby to insure the maintenance of the channel or web in register with the fastener-inserting mechanism. The aforesaid presser-foot and the member that cooperates therewith to clamp the work may be utilized to guide the work as above explained, and for this purpose they are shaped to enter the channel so that they may exercise such guiding function. As herein shown, the clamping members designed to exercise this function are spheroidal, this shape having been found preferable because it is adapted to center narrow channels and at the same time it provides for rolling contact of said members with the work.

For a further understanding of this invention together with other objects and advantageous details and combinations of parts, reference may be had to a more complete description of certain embodiments thereof disclosed in the accompanying drawing, in which, Fig. 1, is a fragmentary side elevation with parts in section of a duplex eyeleting machine employing certain features of this invention.

Fig. 2, is a fragmentary detail partly in section of the upper presserfoot.

Fig. 3, is a front elevation of the parts in the middle of Fig. 1.

Fig. 4, is a fragmentary side elevation of a modification including a work plate interposed between the presser feet.

Fig. 5, is a front elevation of the latter construction, and,

Fig. 6, is a side elevation showing a modified form of presser foot and work support.

Referring to Figs. 1 to 3, A represents a portion of the machine frame having bearings for rock shafts 1 and 2 which carry levers 3 and 4 terminating at their outer ends in hammer portions 5 and 6. These hammer portions are arranged to operate punch and set mechanisms 7 and 8 in which the tools are telescopically related and slidably mounted in bosses 9 and 10 formed as parts of a feed member 11. While these punch and set mechanisms are shown as of the telescopic type, they may be otherwise made if desired, as their construction forms no part of the present invention. The outer ends of these mechanisms are retained in contact with the hammer portions 5 and 6 by means of springs 13 and 14. Fixed to the frame A is a bracket 15 having a post 16 extending forwardly and holding at its forward end a work edge gage 17. This gage has upper and lower work retaining flanges 18 and 19, and has a horizontal slot 20 between the flanges for the reception of an anvil plate 21 carried by and movable with the feed member 11. The anvil plate 21 carries a duplex punching anvil and cooperating set elements for the pair of telescopic punch and set mechanisms 7 and 8. Above and below the post 16, supports 25 and 26 extend forwardly from the bracket 15 and are formed at their outer ends as bifurcated hooks 27 and 28. Seated in the hook portions are trunnions 29 and 30 projecting from stems 31 and 32 of a presserfoot and work support respectively. The presser foot stem 31 extends upwardly from the trunnions 29 and is slidable in a sleeve 33 pivoted at 34 to the head 3. Trunnions 29 are held in engagement within the hook portion 27 by means of a leaf spring 35 fixed to the support 25 at 36 and having a forked outer end bearing on a pin 37 carried by the stem 31. A screw 38 passes through a perforation in the spring 35 and is screwed into the support 25, and a coil spring 39 surrounding the screw 38 is compressed between the spring 35 and the head of the screw, by which means spring 35 may be additionally tensioned against the pin 37.

The stem 32 is supported and the trunnions 30 are held in their seats in the hook 28 by means of a leaf spring 40 fixed at 41 to the support 26 and bearing against the lower faces of the trunnions 30. The stem 32 is extended downwardly and slides within a sleeve 42 journaled at 43 on the head 6. The presser foot and the work support are formed with curved work engaging plate members 44 and 45.

During the normal operation of this machine two confronting elements of work are inserted between the elements 44 and 45 and are placed respectively above and below the anvil support 21, and inserted between the flanges 18 and 19, and held against the body of the gage 17. The punch and set mechanism are then actuated by the hammers 5 and 6 to cause the punches to pick off eyelets from properly positioned raceways and to punch the work. The feed member 11 is then caused to travel laterally while the punches are in the work, and further swinging of the levers 3 and 4 actuates the setting tools to force the eyelets through the holes made by the punches and set the same in the work. The particular mechanisms for actuating the hammers form no part of the present invention and are therefore not disclosed in this application. During the working movement of levers 3 and 4 the sleeves 33 and 42 slide on the stems 31 and 32 and rock the latter slightly on their trunnions. This causes the presserfoot and work support to urge the work against the edge gage 17.

According to manufacturing methods, when work is being eyeleted by an automatic eyeleting machine, whether such machine is of the duplex type or of the single type, each article of work is passed through the machine in regular course regardless of whether one or more eyelets of a series are missed. If the work is being done by a duplex machine the latter is not ordinarily used to insert an eyelet where one has been missed or to replace one that has been improperly set in the first instance, because the eyelets previously inserted interfere with the presserfoot or other work-engaging elements. It has therefore been necessary heretofore to supplement a duplex eyeleting machine with a foot-power machine to supply missing eyelets and to replace eyelets that have been improperly set.

For example, in an automatic eyeleting machine it is impossible to utilize the eyelet-inserting mechanism without subjecting the work to the action of the feeding mechanism, and since the presserfoot in the present machine engages the work in the path of the eyelets the feeding action would cause at least one of the previously inserted eyelets to advance toward and engage the presserfoot. Such eyelet would be likely to catch on the edge of the presserfoot and it might be damaged by the presserfoot or it might damage the presserfoot to cause the work to be stretched or even torn. To overcome this condition so that a machine of the type disclosed may be safely used to insert an eyelet at any point in an article of work that has previously been eyeleted, the present invention provides for maintaining the presserfoot in a retracted position whenever it is desired to do so.

For this purpose the trunnions 29 are formed on a stud 50 and are arranged in eccentric relation to the body of the stud (see Fig. 2). The body of the stud is journaled in the stem 31. Since the trunnions are seated in a fixture, the effect of turning the stud 180 degrees from the position shown in Fig. 1, is to raise the presserfoot 44 to the position indicated by dotted lines. One of the trunnions 29 is elongated to serve as a stem to turn the stud and is provided with a head such as the wing nut 57. To maintain the stud at each of its two positions of use it is provided with diametrically opposite depressions 51, 52, and the stem 31 is provided with a follower 53 arranged to enter said depressions. This follower is arranged to slide in a socket 55 and is maintained in contact with the eccentric stud by a compression spring 54. A plug 56 is screwed into the mouth of the socket to confine the follower and to hold the spring under compression.

The modification shown by Figs. 4 and 5 includes a work-plate 60 arranged to lie between the confronting work elements and in register with the work-support 45 and presserfoot 44. It is fixed to the post 16 by a screw 61 and lies in the same plane as the anvil support 21. The leaf spring 40 is provided with a reinforcing spring precisely like the spring 39 hereinbefore described as arranged to reinforce the presserfoot spring 35.

The modification shown by Fig. 6 includes an anti-friction work-support and an anti-friction presserfoot arranged to cooperate therewith. The antifriction effect is provided by substituting rollers 66 and 65 in place of the plates 45 and 44 respectively. These rollers are mounted on studs 68 and 67 whose axes are at right angles to the direction of feed, and are therefore adapted to have rolling contact with the work as the latter advances in the direction of feed. For corset work the rollers are preferably shaped to run in the channels of unstiffened fabric between stiffening strips or "bones", and thus guide the corsets by such channels instead of depending upon edge gages to maintain the channels in register with the eyelet-inserting mechanism. Under such conditions the work support and presserfoot fulfill the functions of an edge gage and avoid the necessity of an additional device such as the gage 17. Although Fig. 6 does not include an intermediate work-plate such as that indicated at 60 in Figs. 4 and 5 it will be understood that the use of such a plate will be optional.

While this invention has been described as applied to a duplex eyeleting machine, it will be understood that some or all the features thereof are also applicable to single eyeleting machines or other machines of like nature.

Having thus described certain embodiments of this invention, it should be evident to those skilled in the art that many changes and modifications might be made therein without departing from its spirit or scope as defined by the appended claims:

1. In an eyelet-setting machine, in combination, punch-and-set work-feeding mechanism, a presser-foot and a work-support having lateral movements, means for causing said presser-foot and support to normally engage the work during the feed thereof, and means actuable at will for maintaining said presser-foot retracted substantially from the work-support.

2. A fastener-inserting machine comprising a work-support, a presserfoot, fastener-inserting mechanism, work-feeding mechanism adapted to operate independently of said presserfoot, the presserfoot being arranged to engage the work in advance of said feeding mechanism to maintain a drag during the feeding period, and means usable at will to maintain the presserfoot retracted from operative position.

3. In an eyelet-setting machine, in combination, punch-and-set work-feeding mechanism, a pivotally mounted presser-foot, a support for the latter, means for causing said presser-foot to normally engage the work, and means interposed between said support and presser-foot to retract the latter and hold it spaced from the work-support.

4. The combination, in a fastener-inserting machine, of work-feeding mechanism, a presserfoot, a pair of trunnions carried by said presserfoot, a support for said trunnions and means for relatively adjusting said trunnions and the presserfoot to change the position of the presserfoot relatively to said support.

5. The combination, in a fastener-inserting machine, of work-feeding mechanism, a presserfoot, a rotatively adjustable stud journaled in the presserfoot, the axis of said stud being parallel to the face of the work, and said stud having eccentric elements at its ends, a support engaging said eccentric elements, and means by which said stud may be turned to cause said eccentric elements to adjust the presserfoot relatively to said support.

6. The combination, in a fastener-inserting machine, of work-feeding mechanism, a presserfoot, a rotatively adjustable stud journaled in the presserfoot, the axis of said stud being paralled to the face of the work and said stud having eccentric elements at its ends, a support engaging said eccentric elements, and means carried by said presserfoot to maintain said stud in various positions of rotative adjustment.

7. The combination, in a fastener inserting machine, of work-feeding mechanism, a presserfoot, a rotatively adjustable stud journaled in the presserfoot, the axis of said stud being paralled to the face of the work and said stud having eccentric elements at its ends, a support engaging said eccentric elements, said stud having one or more depressions, and a spring-stressed member carried by the presserfoot for cooperating with said depressions to maintain said stud against accidental turning.

8. In an eyelet-setting machine, in combination, punch-and-set mechanism, work-feeding means, a substantially ball-shaped work-supporting element and a substantially ball-shaped presser-foot opposed thereto for yieldingly clamping the work against the same.

9. The combination, in a fastener-inserting machine, of work-feeding mechanism, a roll arranged to support the work, and a presserfoot having a spheroidal roller arranged to cooperate with said supporting roll during the feeding period to clamp the work.

10. In a duplex eyeleting machine, the combination with eyelet-inserting mechanism and mechanism for feeding two confronting work elements, of two cooperative work-clamping members arranged to engage said work-elements in advance of the feeding means and to clamp them against each other during the feeding period, said clamping members being shaped to run in corresponding channels in said work elements to maintain certain portions of said work elements in register with said eyelet-inserting mechanism.

11. In a duplex eyeleting machine, the combination with eyelet-inserting mechanism and mechanism for feeding two confronting work elements, of two cooperative work-clamping members arranged to engage said work-elements in advance of the feeding means and to clamp them against each other during the feeding period, said clamping members being arranged to have rolling contact with the work and being shaped to run in corresponding channels in said work elements to guide the latter by such channels.

12. In a duplex eyeleting machine, the combination with mechanism for feeding two confronting work elements, of work-clamping means comprising two cooperative rollers arranged to run in channels in said work elements to guide the latter by such channels.

13. In a duplex eyeleting machine, the combination with mechanism for feeding two confronting work elements, of work clamping means comprising two cooperative rollers arranged to engage said work elements in advance of said feeding mechanism to clamp them against each other during the feeding period, said rollers having spheroidal work-engaging surfaces.

In testimony whereof, I have signed my name to this specification.

GEORGE W. JACQUES.